US008317086B2

(12) United States Patent
Dudek et al.

(10) Patent No.: US 8,317,086 B2
(45) Date of Patent: Nov. 27, 2012

(54) COMMUNICATION OF TRANSACTION DATA WITHIN A SELF-CHECKOUT ENVIRONMENT

(75) Inventors: Clark A. Dudek, Raleigh, NC (US);
Phillip D. Jones, Raleigh, NC (US);
Sheryl A. Paradise, Raleigh, NC (US);
Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/029,081

(22) Filed: Feb. 16, 2011

(65) Prior Publication Data
US 2012/0205433 A1 Aug. 16, 2012

(51) Int. Cl.
*G06F 17/00* (2006.01)
*G06F 19/00* (2011.01)
*G06F 7/08* (2006.01)
*G06K 7/10* (2006.01)
*G06K 7/14* (2006.01)
*G06K 5/00* (2006.01)
*G06K 7/016* (2006.01)
*G06K 15/00* (2006.01)
*G03B 7/08* (2006.01)
*G06Q 40/00* (2012.01)
*G06Q 20/00* (2012.01)
*G07D 11/00* (2006.01)
*G07F 19/00* (2006.01)

(52) U.S. Cl. .............. 235/375; 235/462.11; 235/462.15; 235/462.24; 235/474; 235/378; 235/379; 235/380; 235/381; 705/16; 705/23; 705/64

(58) Field of Classification Search ............. 235/462.15, 235/462.11, 462.24, 474, 345, 378–381; 705/16, 23, 64; 186/59
See application file for complete search history.

(56) References Cited

U.S. PATENT DOCUMENTS

| 6,123,259 | A  | * | 9/2000  | Ogasawara ................... 235/380 |
| 7,680,702 | B1 |   | 3/2010  | Oakes, III |
| 7,778,886 | B1 | * | 8/2010  | Maroney et al. ............. 705/26.1 |
| 8,002,175 | B2 | * | 8/2011  | Kuriyama et al. ............ 235/379 |
| 2002/0050526 | A1 | * | 5/2002 | Swartz et al. ........... 235/472.02 |
| 2002/0091569 | A1 | * | 7/2002 | Kitaura et al. ................. 705/14 |
| 2002/0138374 | A1 | * | 9/2002 | Jennings et al. ............... 705/29 |
| 2003/0158796 | A1 | * | 8/2003 | Balent ............................ 705/28 |
| 2003/0233276 | A1 | * | 12/2003 | Pearlman et al. .............. 705/14 |
| 2004/0020988 | A1 | * | 2/2004 | Omori ....................... 235/462.01 |
| 2005/0102181 | A1 | * | 5/2005 | Scroggie et al. ............... 705/14 |
| 2006/0054695 | A1 |   | 3/2006  | Owada |

(Continued)

OTHER PUBLICATIONS

Barcode Reader, Wikipedia article, http://en.wikipedia.org/w/index.php?title=Barcode_reader&oldid=386064765, 2010.

(Continued)

*Primary Examiner* — Daniel Walsh
(74) *Attorney, Agent, or Firm* — Olive Law Group, PLLC; Thomas E. Tyson (57) ABSTRACT

Systems and method for communication of transaction data within a self-checkout environment are disclosed. According to an aspect, a method includes controlling a display device to display a machine-readable representation of transaction data. The method may include receiving a signal that indicates acknowledgement of reading of the machine-readable representation of the transaction data. Further, the method may include controlling the display device to display a machine-readable representation of other transaction data in response to receipt of the signal.

23 Claims, 5 Drawing Sheets

U.S. PATENT DOCUMENTS

| | | | |
|---|---|---|---|
| 2007/0022058 A1* | 1/2007 | Labrou et al. | 705/67 |
| 2008/0033817 A1* | 2/2008 | Billmaier et al. | 705/14 |
| 2008/0035734 A1 | 2/2008 | Challa et al. | |
| 2008/0296392 A1* | 12/2008 | Connell et al. | 235/472.01 |
| 2008/0302872 A1* | 12/2008 | Tate | 235/462.07 |
| 2009/0088203 A1 | 4/2009 | Havens et al. | |
| 2009/0094100 A1 | 4/2009 | Xavier | |
| 2009/0182630 A1 | 7/2009 | Otto et al. | |
| 2009/0276307 A1* | 11/2009 | Griffith et al. | 705/14.19 |
| 2009/0307080 A1* | 12/2009 | Jain et al. | 705/14.38 |
| 2010/0030592 A1 | 2/2010 | Evans et al. | |
| 2010/0057573 A1* | 3/2010 | Singhal | 705/14.64 |
| 2010/0125497 A1* | 5/2010 | Arguello | 705/14.33 |
| 2010/0125509 A1 | 5/2010 | Kranzley et al. | |
| 2010/0138344 A1 | 6/2010 | Wong et al. | |
| 2010/0241495 A1* | 9/2010 | Maniyar et al. | 705/14.1 |
| 2011/0024490 A1 | 2/2011 | Kangas et al. | |
| 2011/0246284 A1* | 10/2011 | Chaikin et al. | 705/14.38 |
| 2012/0000978 A1* | 1/2012 | Rollyson et al. | 235/383 |
| 2012/0029994 A1* | 2/2012 | Barkan et al. | 705/14.25 |
| 2012/0067943 A1* | 3/2012 | Saunders et al. | 235/375 |

OTHER PUBLICATIONS

Mobile Phone POS Terminal is Revolutionizing the Industry, Art Business News, http://findarticles.com/p/articles/mi_m0HMU/is_12_32/ai_n15998941, Dec. 2005.

Near Field Communication, Wikipedia article, http://en.wikipedia.org/w/index.php?title=Near_field_communication&oldid=401111124, 2010.

Bluetooth, Wikipedia article, http://en.wikipedia.org/w/index.php?title=Bluetooth&oldid=401467620, 2010.

Bluetooth: On Your Phone, Bluetooth SIG, Inc., http://www.bluetooth.com/English/Experience/Pages/On_Your_Phone.aspx.

Cellfire: Digital Coupons, Cellfire Inc., http:I/www.cellfire.com/deals.php.

Zavers, Zavers, http://zavers.com/home.

Mobile Marketer, Napean LLC, http://www.mobilemarketer.com/cms/news/commerce/4067.html.

Group Communications: The Next Generation of Mobile Shopping, METRO AG, http://www.metrogroup.de/servlet/PB/menu/1245190_I2/index.htm.

Best Mobile Slideshow Maker App Software, http://www.dvd-photo-slideshow.com/pdf-files-dvd-photo-slideshow/Best-Mobile-Slideshow-Maker-App-Cell-Phone-Photo-Slide-Show.pdf.

Free Slideshow Builder, Free Slideshow Software, http://ajaxslideshow.com/repeat-slideshow-droid.html.

System and Method for Virtual 3D Bar Code Scanning and Decoding, IBM, IP.com number: IPCOM000181803D, Apr. 13, 2009, URL: http://www.ip.com/pubview/IPCOM000181803D.

* cited by examiner

FIG. 1

CONTROL A DISPLAY DEVICE TO DISPLAY A MACHINE-READABLE REPRESENTATION OF TRANSACTION DATA
200

READ THE DISPLAYED MACHINE-READABLE REPRESENTATION OF THE TRANSACTION DATA
202

CONTROL AN OUTPUT DEVICE TO OUTPUT A CONTROL SIGNAL FOR REQUESTING DISPLAY OF ANOTHER MACHINE-READABLE REPRESENTATION OF TRANSACTION DATA IN RESPONSE TO READING THE DISPLAYED MACHINE-READABLE REPRESENTATION
204

RECEIVE SIGNAL
206

CONTROL THE DISPLAY DEVICE TO DISPLAY A MACHINE-READABLE REPRESENTATION OF OTHER TRANSACTION DATA IN RESPONSE TO RECEIPT OF THE SIGNAL
208

COMMUNICATION OF TRANSACTION DATA WITHIN A SELF-CHECKOUT ENVIRONMENT

BACKGROUND

1. Field of the Invention

The present invention relates to electronic transactions, and more specifically, systems and methods for communicating transaction data within a self-checkout environment.

2. Description of Related Art

Self-checkout systems have become common in retail stores for providing shoppers with the ability to pay for purchases from a retailer without direct input to the checkout process by retailer personnel. Such systems are an alternative to traditional cashier-staffed checkout systems. In self-checkout systems, shoppers are permitted to scan barcodes on their items or products for identifying items to be purchased. During checkout, the process of scanning each purchase item at a shopper terminal can be a slow task. This process includes aligning and swiping the barcode of each purchase item with a scanner. In addition, the process may also include individually removing each purchase item from a shopping cart or basket for placement near the scanner. These steps can slow the checkout process. For at least this reason, it is desired to provide improved systems and methods for hastening the checkout process and for making the process more convenient for shoppers.

BRIEF SUMMARY

One or more embodiments of the present invention provide methods and systems for communicating transaction data within a self-checkout environment. According to an aspect, a method includes controlling a display device to display a machine-readable representation of transaction data. For example, a display of a mobile computing device may be controlled to display a barcode of a purchase item. The method may include receiving a signal that indicates acknowledgement of reading of the machine-readable representation of the transaction data. For example, a microphone of a mobile computing device may detect an audible signal emitted by a shopper terminal that indicates that a displayed barcode has been read. Further, the method may include controlling the display device to display a machine-readable representation of other transaction data in response to receipt of the signal. For example, a mobile computing device may display a barcode of another purchase item in response to receiving a signal that acknowledges reading of a previously-displayed barcode.

According to another aspect, a method includes reading a displayed sequence of machine-readable representations of transaction data and associated shopping data. For example, a scanner of a shopper terminal may scan a displayed sequence of barcodes that represent purchase transaction data and associated shopping data, such as, but not limited to, shopper profile information, payment information, and purchase item information. The method may also include controlling an output device to output a control signal in response to reading each machine-readable representation for requesting display of another of the machine-readable representations. For example, in response to scanning a barcode, a speaker of a shopper terminal may emit an audible signal for acknowledging the scan and for requesting display of another barcode.

According to another aspect, a system includes a mobile computing device and a shopper terminal. The mobile computing device may control a display device to display a sequence of machine-readable representations of transaction data. For example, transaction manager of a mobile computing device may control the display of the mobile computing device to display a sequence of barcodes representing purchase transaction data. The shopper terminal may read the displayed sequence of machine-readable representations. For example, a shopper terminal may read a sequence of barcodes. The shopper terminal may also control an output device to output a control signal for requesting display of another of the machine-readable representation in response to reading each machine-readable representation. For example, in response to scanning each barcode of a sequence of barcodes displayed by a mobile computing device, a speaker of a shopper terminal may emit an audible signal requesting display of another barcode.

DETAILED DESCRIPTION

Exemplary systems and methods for communication of transaction data within a self-checkout environment in accordance with embodiments of the present invention are disclosed herein. Particularly, described herein is a mobile computing device including a transaction manager configured to control a display device to display one or more machine-readable representations of transaction data. For example, an application of a mobile smartphone may control a display of the smartphone to display a sequence of barcodes that represent items to be purchased by a shopper. The sequence may be displayed to a scanner of a shopper terminal in a slide show type format or any other suitable format. Barcodes may also be displayed that represent other transaction data or shopping data as will be described herein. The shopper terminal may read the machine-readable representations for use in a purchase transaction. As each machine-readable representation is read, the shopper terminal may output a signal for requesting display of another machine-readable representation of data and for acknowledging the reading of a displayed machine-readable representation of data. The mobile computing device may receive the signal and may display a machine-readable representation of other transaction data in response to receipt of the signal. For example, a signal may trigger the display of the next barcode in a sequence of barcodes for scanning by the shopper terminal.

As referred to herein, the term "mobile computing device" should be broadly construed. For example, a mobile computing device may include, but is not limited to, a smart phone, a cell phone, a pager, a personal digital assistant (PDA, e.g., with GPRS NIC), a mobile computer with a smart phone client, or the like. An electronic device can also include any type of conventional computer, for example, a laptop computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. Typically, these devices use display devices for displaying images and/or text.

As referred to herein, the terms "transaction data" and "shopping data" should be broadly construed. For example, transaction data may include, but is not limited to, any type of data that may be used for conducting a purchase transaction. Exemplary transaction data includes a purchase item identifier, position coordinates for a location where a machine-readable representation of a purchase item identifier was read, a time when a machine-readable representation of a purchase item identifier was read, proximity information of a computing device, discount information for a purchase item (e.g., coupon information for a purchase item), shopper profile information, transaction security information, payment information, purchase item information, and the like. Shopping data may include, but is not limited to, any type of data relevant to a shopper or collected by a mobile computing device while a shopper is shopping. Exemplary purchase data includes position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information. In accordance with embodiments of the present invention, transaction data and/or purchase data may be gathered by a mobile computing device. Further, the mobile computing device may generate one or more machine-readable representations (e.g., one or more barcodes) of the transaction data and/or purchase data for display by a display device. The displayed machine-readable representations may be read by a shopper terminal for receipt of the data thereon in accordance with embodiments of the present invention. Exemplary barcodes include, but are not limited to, linear barcodes and matrix (2D) barcodes.

Figure 1:
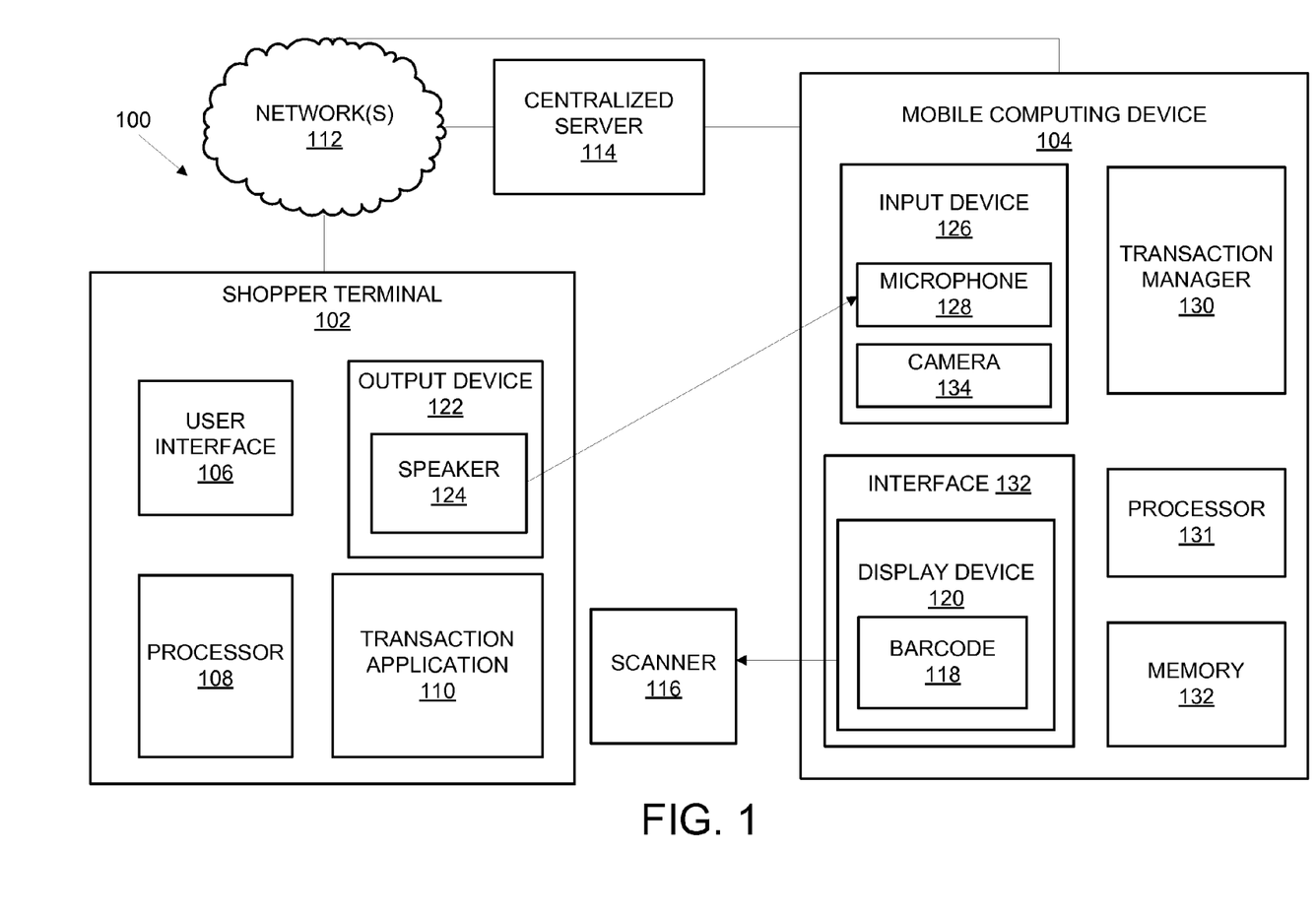
FIG. 1 is a block diagram of an example system including a shopper terminal and a mobile computing device in accordance with embodiments of the present invention.

FIG. 1 illustrates a block diagram of an example system 100 including a shopper terminal 102 and a mobile computing device 104 in accordance with embodiments of the present invention. The system 100 may be located within a retail store for implementing shopper self-checkout services. Referring to FIG. 1, the shopper terminal 102 may be part of a self-checkout system including one or more other shopper terminals or computing devices that are not shown in FIG. 1 and that can be in wired or wireless communication with the shopper terminal 102.

The shopper terminal 102 may include a user interface 106 for interfacing with shoppers. For example, the user interface 106 may include a display for providing shoppers with purchase transaction information, such as itemized purchases and prices, a total cost associated with a purchase, and related purchase transaction information. The shopper terminal 102 may include a processor 108 executing software. The processor 108 may execute a transaction application 110, which may implement point-of-sale (POS) functions. The shopper terminal 102 may communicate over one or more networks 112 with network entities, such as financial institutions. Purchases may be made via the shopper terminal 102 whereby the shopper terminal 102 facilitates electronic funds transfers over a network between customer accounts for one or more financial institutions and an establishment that implements the shopper terminal 102 (i.e., a vendor). For this purpose, the shopper terminal 102 may be communicatively coupled to one or more networks 112. The shopper terminal 102 is communicatively coupled to a centralized server 114 configured to provide pricing information for purchase items identified by barcodes or other machine-readable representations of data scanned by a scanner 116 communicatively connected to the shopper terminal 102. Examples of machine-readable representations of data may include any suitable optical machine-representation such as, but not limited to, barcodes or any image that may represent data and that may be read and interpreted by a computing device or scanner.

In an example, the mobile computing device 104 may be communicatively connected to the centralized server 114 directly or via the network 112. For example, the mobile computing device 104 may communicatively connect to the server 114 via an in-store wireless network. The mobile computing device 104 may automatically connect or request connection to the wireless network when in range of the wireless network. In another example, the mobile computing device 104 may use a secure Internet connection via network 112 for connecting to the server 114. The connection via the network 112 may be established using a GPRS/CDMA connection. By the connection through the server 114, the mobile computing device 104 may also connect to and exchange data with the shopper terminal 102 in accordance with embodiments of the present invention. The server 114 may include a store integrator function for providing the mobile computing device 104 with point-of-sale related information, such as, but not limited to, pricing, item specific information, transaction data, and promotional information.

A shopper may scan a barcode 118 or other machine-readable representation of transaction data or purchase data being displayed by a display device 120 of the mobile computing device 104. For example, the barcode 118 may be displayed on the display device 120 of the mobile computing device 104. The mobile computing device 104 may be positioned such that the barcode 118 faces the scanner 116 for suitable scanning of the barcode 118 by the scanner 116. The scanner 116 may be any suitable electronic device having a light source, a lens, and a light sensor for translating optical impulses into electrical signals. The scanner 116 may output the electrical signals to the shopper terminal 102. The shopper terminal 102 may interpret the electrical signals as transaction data or purchase data represented by the barcode 118. In an example, in response to scanning the barcode 118, the scanner 116 may transmit Universal Product Code (UPC) information represented by the scanned barcode 118 to the shopper terminal 102 or the server 114. The shopper terminal 102 or the server 114 may search a UPC database for the UPC information and may return a price for a purchase item. The price information may be used for processing a purchase transaction at the shopper terminal 102.

In accordance with embodiments of the present invention, the shopper terminal 104 may control an output device 122 to output a control signal for acknowledging reading of a machine-readable representation of data. For example, a speaker 124 may be controlled to output an audible signal in response to reading the barcode 118. Other exemplary control signals includes, but are not limited to, a vibratory signal, an electromagnetic signal, an optical signal, the like, and combinations thereof. In an example, a suitable electro-mechanical device may be controlled to shake a platform on which the mobile computing device 102 is placed for acknowledging reading of a barcode. In another example, a suitable wireless transmitter may be controlled to communicate an electromagnetic signal for acknowledging reading of a barcode. In another example, an optical signal generator (e.g., a light emitting diode (LED)) may be controlled to communicate an optical signal for acknowledging reading of a barcode.

A control signal output by the output device 122 may be detected or sensed by an input device 126 of the mobile computing device 102. For example, a microphone 128 may sense an audible signal output by the speaker 124. Continuing the example of a vibratory signal, the mobile computing device 104 may include an accelerometer or other vibration-sensitive component for detecting the vibratory signal. Further, continuing the example of an electromagnetic signal, the mobile computing device 104 may include a receiver for detecting the electromagnetic signal. Continuing the example of an optical signal, the mobile computing device 104 may include a camera for detecting the optical signal.

A transaction manager 130 may be notified of receipt of the signal at the input device 126. The transaction manager 130 may be part of an application (often referred to as an "app"), which may be implemented by a processor 131 executing software. In response to receipt of the signal, the transaction manager 130 may control the display device 120 to remove the barcode 118 that has been read and display another barcode representing other transaction data or shopping data. As such, a control signal output by the shopper terminal 102 may acknowledge the reading of a displayed barcode. Further, a control signal may request display of another barcode.

A memory 132 may store a plurality of machine-readable representations of data for use in communicating to transaction data and/or shopper data to the shopper terminal 102. Such data may be communicated to the shopper terminal 102 in accordance with embodiments of the present invention. For example, the transaction manager 130 may control the display device 120 to display a sequence of barcodes of transaction data and/or shopper data. In turn, the shopper terminal 102 may read the displayed sequence of barcodes, and may control the output device 122 to output a control signal for requesting display of another of the barcodes in response to reading each barcode. Thereby, the mobile computing device 104 can know when a barcode has been read, and when to display the next barcode in the sequence.

Figure 2:
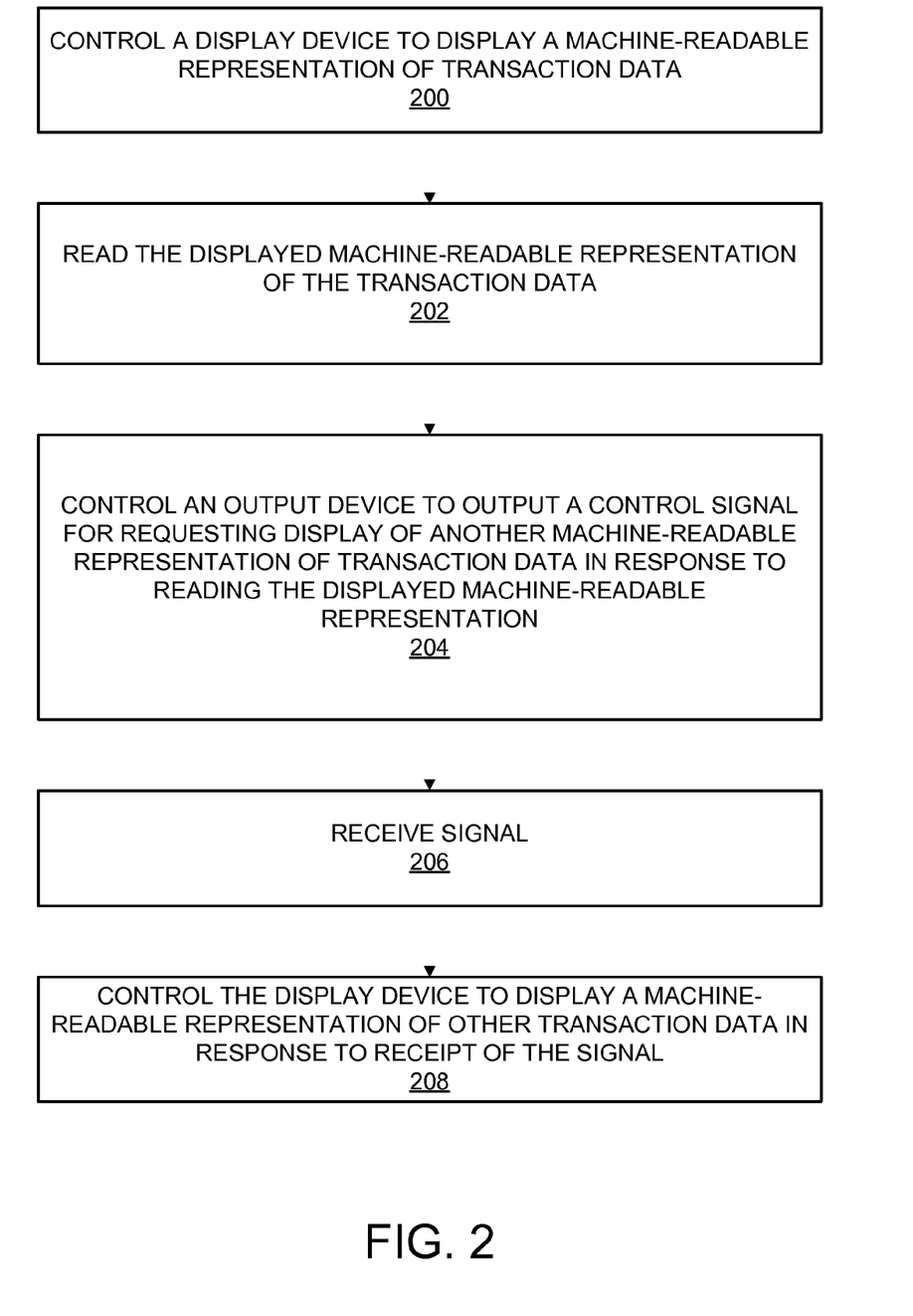
FIG. 2 is a flowchart of an example method for communicating transaction data to a shopper terminal in accordance with embodiments of the present invention.

FIG. 2 illustrates a flowchart of an example method for communicating transaction data to a shopper terminal in accordance with embodiments of the present invention. The method of FIG. 2 is described as being implemented by the system 100 shown in FIG. 1, although the method may be implemented by any suitable self-checkout system. The method may be implemented by hardware, software, and/or firmware of the shopper terminal 102, the mobile computing device 104, and/or another computing device, such as a server.

Referring to FIG. 2, the method includes controlling 200 a display device to display a machine-readable representation of transaction data. For example, the transaction manager 130 may control the display device 120 to display a barcode that represents UPC information. The barcode may be an image captured of an item to be purchased by a user of the mobile computing device 104. The user may place the mobile computing device 104 such that the displayed barcode 118 is in position for scanning by the scanner 116. The barcode 118 may be the first or another one in a sequence of barcodes to be communicated to the shopper terminal 102 in a purchase transaction. In an example, the user of the mobile computing device 104 may enter input into an interface 132 for initiating the transaction manager 130 to communicate transaction data to the shopper terminal 112.

The method of FIG. 2 includes reading 202 the displayed machine-readable representation of the transaction data. For example, the transaction application 110 may control the scanner 116 to read barcodes. The scanner 116 may scan the barcode 118 and communicate UPC information represented by the barcode 118 to the shopper terminal 102 for use in processing a purchase transaction. Any transaction data and/or shopper data may be represented by the barcode 118, and may be read by the shopper terminal 102 for use in processing a purchase transaction.

The method of FIG. 2 includes controlling 204 an output device to output a control signal for requesting display of another machine-readable representation of transaction data in response to reading the displayed machine-readable representation. For example, the transaction application 110 may control the speaker 124 to output an audible signal for requesting display of another barcode in response to reading the barcode 118. In another example, the transaction application 110 may control the speaker to output any suitable signal for acknowledging reading of the barcode 110.

The method of FIG. 2 includes receiving 206 the signal, and controlling 208 the display device to display a machine-readable representation of other transaction data in response to receipt of the signal. For example, the microphone 128 may detect an audible signal output by the speaker 128. The transaction manager 130 may be notified of detection of the signal. In response to receipt of the signal, the transaction manager 130 may control the display device 120 to display another barcode for reading by the scanner 116. The next displayed barcode may the next in the sequence of barcodes for use in the purchase transaction. The barcodes may represent transaction data and/or purchase data. The shopper terminal 102 may read the sequence of barcodes and use the corresponding data for processing a purchase transaction for the user of the mobile computing device 104.

Machine-readable representations of data may be received or generated by a mobile computing device in accordance with embodiments of the present invention. In an example, a shopper may initiate an application residing on the mobile computing device 104 for imaging barcodes of items to be purchased. The user may position a digital camera 134 of the mobile computing device 104 with respect to a barcode on an item for capturing an image of the barcode. The captured image of the barcode may be used for display to a scanner in accordance with embodiments of the present invention. In another example, an image of any other identifier for an item may be captured by the camera 134 for use in generating a barcode or other machine-readable representation for representing an identifier of the item.

Figure 3:
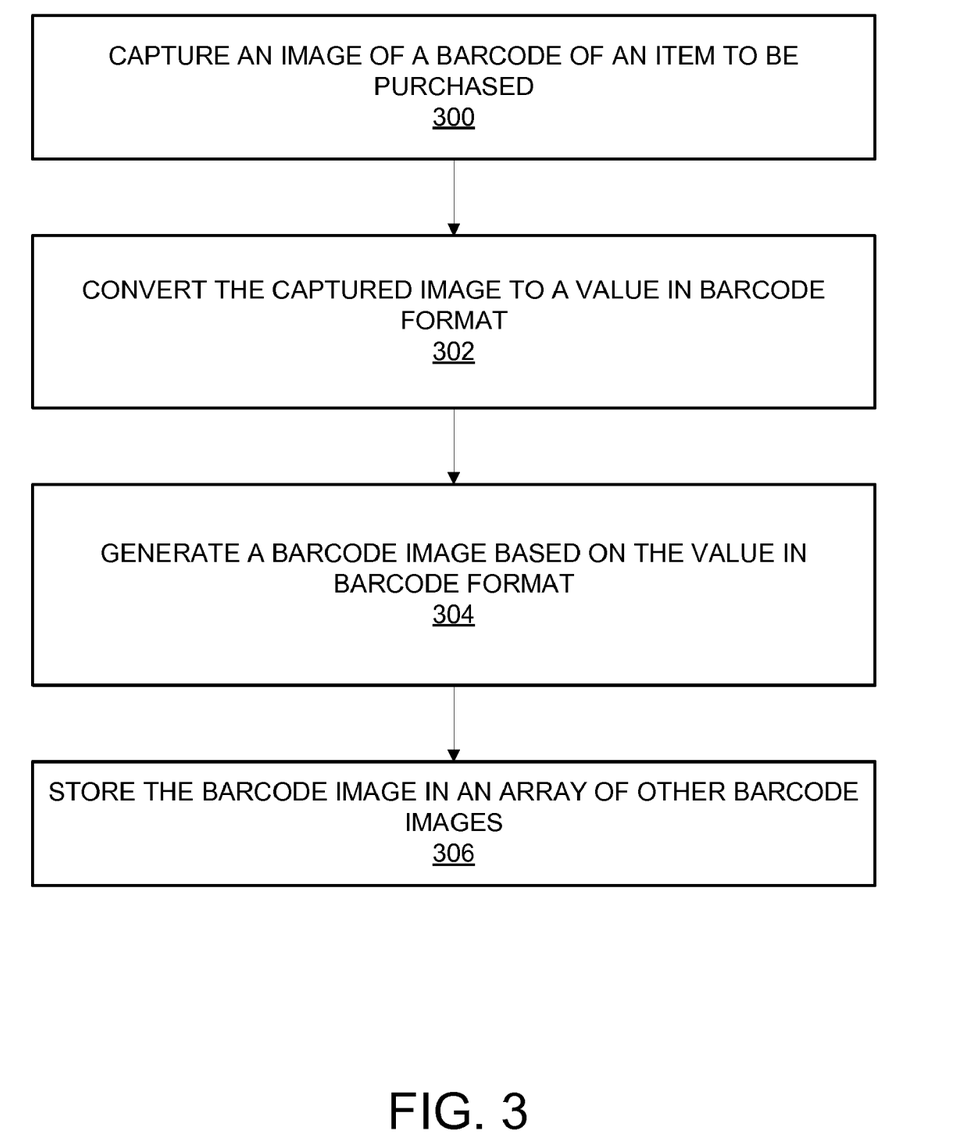
FIG. 3 is a flowchart of an example method for generating machine-readable representations of data associated with items to be purchased in accordance with embodiments of the present invention.

FIG. 3 illustrates a flowchart of an example method for generating machine-readable representations of data associated with items to be purchased in accordance with embodiments of the present invention. The method of FIG. 3 is described as being implemented by the mobile computing device 104 shown in FIG. 1, although the method may be implemented by any suitable mobile computing device. The method may be implemented by hardware, software, and/or firmware of the mobile computing device 104 and/or another computing device.

Referring to FIG. 3, the method includes capturing 300 an image of a barcode of an item to be purchased. For example, the user may interact with the interface 132 to input commands to initiate the transaction manager 130 for capturing images of barcodes of items to be purchased. In this example, the transaction manager 130 may then initiate a function for enabling a camera function of the mobile computing device 104. The user may position the camera 134 for capturing an image of a barcode of an item to be purchased. Next, the camera 128 may capture the image of the barcode. The image may be formatted in any suitable image format, such as, but not limited to, JPEG format.

The method of FIG. 3 includes converting 302 the captured image to a value in barcode format. For example, the transaction manager 130 may convert a JPEG format image of a barcode to a UPC value, or an alphanumeric barcode value, such as code 128, code 39, code 93, and LOGMARS.

The method of FIG. 3 includes generating 304 a barcode image based on the value in barcode format. For example, the transaction manager 130 may generate a barcode image based on the UPC value. The transaction manager 130 may generate the barcode image soon after the capture of the image of the barcode from the item to be purchased. Alternatively, the barcode image may be generated later during a purchase transaction with the shopper terminal 102.

The method of FIG. 3 includes storing 306 the barcode image in an array of other barcode images. For example, the transaction manager 130 may generate multiple barcode images of multiple items to be purchased. These barcode images may have been generated based on captured images of barcodes of items to be purchased as described herein above. The barcode images may be stored in an array for subsequent display to the scanner 116 of the shopper terminal 102 in a sequence in accordance with embodiments of the present invention.

Figure 4:
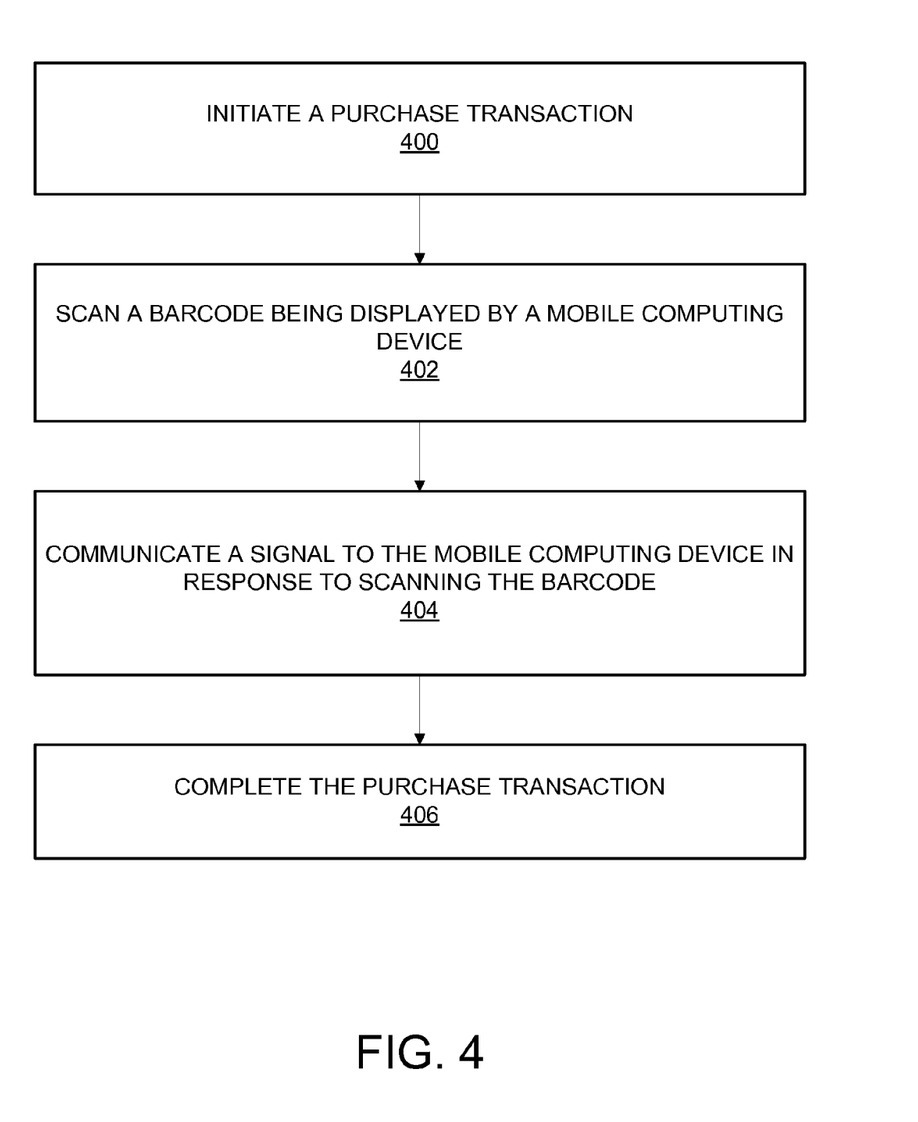
FIG. 4 is a flowchart of an example method implemented by a shopper terminal for scanning barcodes displayed by a computing device and for acknowledging reading of the barcode according to embodiments of the present invention.

System and method embodiments according to the present disclosure may be implemented, for example, in a self-checkout system. In this implementation, rather than scanning purchase items one-by-one on a scanner of a shopper terminal, the shopper may capture images of barcodes of items to be purchased as the shopper gathers items in a retail store. The captured images of barcodes may be converted to an array of barcode images for sequential display to a scanner of a shopper terminal in accordance with embodiments of the present invention. FIG. 4 illustrates a flowchart of an example method implemented by a shopper terminal for scanning barcodes displayed by a computing device and for acknowledging reading of the barcode according to embodiments of the present invention. The method of FIG. 4 is described as being implemented by the shopper terminal 102 shown in FIG. 1, although the method may be implemented by any suitable shopper terminal. The method may be implemented by hardware, software, and/or firmware of the shopper terminal 102 and/or another computing device.

Referring to FIG. 4, the method includes initiating 400 a purchase transaction. For example, a user may interact with the user interface 106 of the shopper terminal 102 for initiating a purchase transaction. In response to initiation of the purchase transaction, the scanner 116 may be activated for reading barcodes.

The method of FIG. 4 includes scanning 402 a barcode being displayed by a mobile computing device. For example, the scanner 116 may scan the barcode 118 being displayed by the mobile computing device 104. In an example, the barcode 118 may represent UPC information. In another example, the barcode 118 may include transaction data and/or shopping data. In yet another example, the barcode 118 may include communication layer information, such as checksum information (e.g., information relating to a number of barcodes to be scanned). In this example, the information indicating the number of barcodes to be scanned can be compared to an actual number of barcodes scanned for validating the purchase transaction. In another example, the barcode 118 may include information about a particular purchase item and/or all of the items to be purchased.

The method of FIG. 4 includes communicating 404 a signal to the mobile computing device in response to scanning the barcode. For example, the transaction application 110 may control the speaker 124 to output an audible signal. The signal may indicate provide feedback to the mobile computing device 104 for indicating whether the scan was valid, invalid, or other conditions. For example, the transaction application 110 may apply a validation analysis to received transaction data and shopping data. In an example, the validation analysis may include validating checksum information or other communication layer information. Validation of the checksum information or other communication layer information may be verified by communication of the signal. Different signals may indicate whether one or more barcodes have been validated. The transaction manager 130 may interpret the signals and display one or more barcodes in a sequence based on whether receipt of the barcodes is acknowledged or validated.

The method of FIG. 4 includes completing 406 the purchase transaction. For example, the shopper terminal 102 may obtain pricing information based on items identified by scanned barcodes for use in calculating a total cost for the purchase. Further, for example, the shopper terminal 102 may obtain payment information and/or discount information (e.g., coupon information) from the data represented by the scanned barcodes. This information may be used for completing the purchase transaction.

Figure 5:
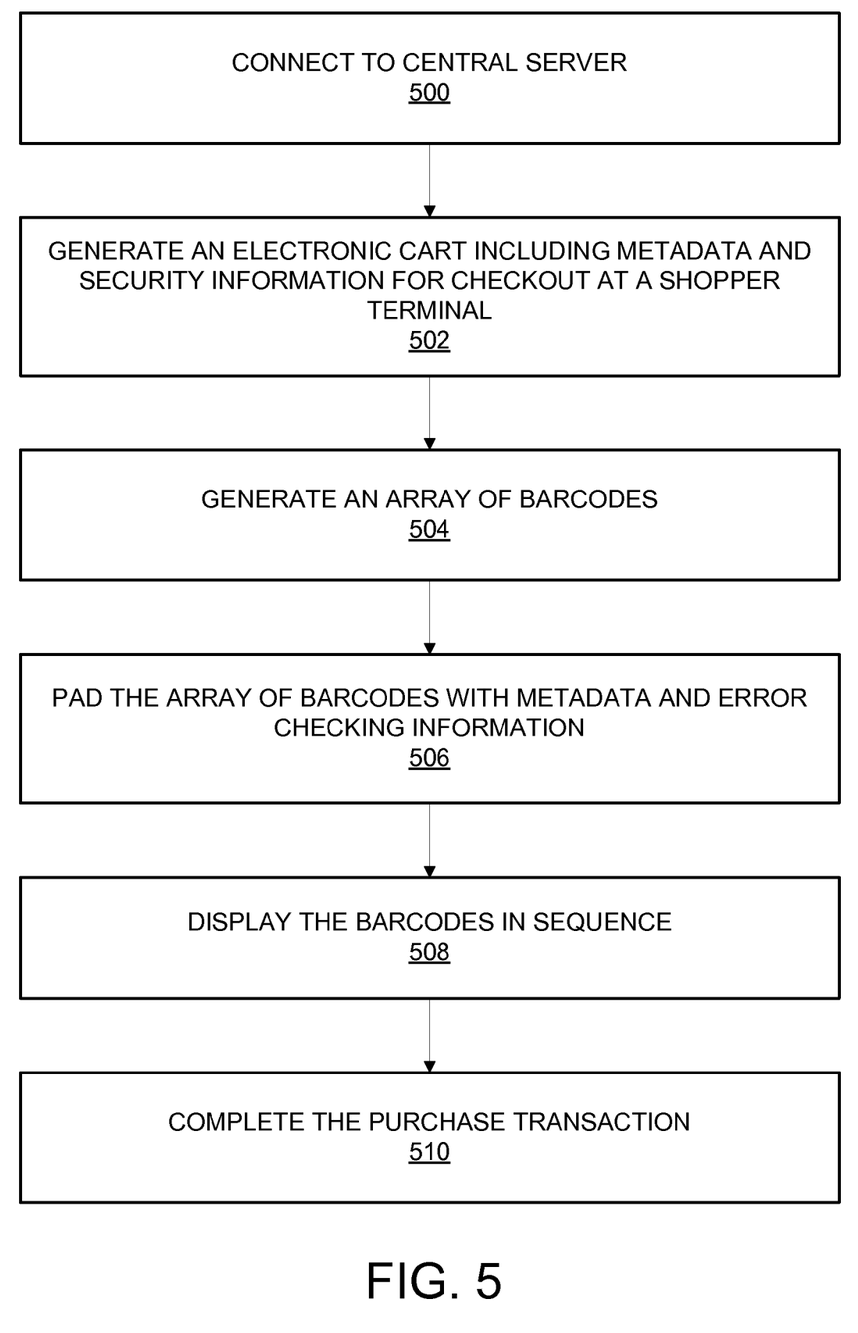
FIG. 5 is a flowchart of an example method implemented by a mobile computing device for conducting a purchase transaction at a shopping terminal.

In accordance with embodiments of the present invention, FIG. 5 illustrates a flowchart of an example method implemented by a mobile computing device for conducting a purchase transaction at a shopping terminal. The method of FIG. 5 is described as being implemented by the mobile computing device 104 shown in FIG. 1, although the method may be implemented by any suitable mobile computing device. The method may be implemented by hardware, software, and/or firmware of the mobile computing device 104.

Referring to FIG. 5, the method may include connecting 500 to a central server. For example, the mobile computing device 104 may connect to the centralized server 114. Metadata, as described herein, may be provided by the mobile computing device 104 to the centralized server 114 through the connection. Further, the mobile computing device 104 may securely connect to the server 114 and provide to the server 114 an identification of the mobile computing device 104. Such identification information may be provided before or during checkout at a shopper terminal. The server 114 may provide the mobile computing device 104 with a key for secure checkout at a shopping terminal.

The method of FIG. 5 includes generating 502 an electronic cart including metadata and security information for checkout at a shopper terminal. For example, prior to checkout at the shopper terminal 102, the transaction manager 130 may generate an electronic cart for use in conducting a purchase transaction with the shopper terminal 102.

In an example, metadata may include, but is not limited to, header information and cart information. This data may be independent of any one purchase item. The metadata may include cart information such as an intended shopping list. Any transaction specific information can also be included in the metadata. For example, transaction information, such as unique identifiers, loyalty information, coupons, and the like may be included in the metadata. There can also be item specific metadata, such as the scan times for each of the item and/or location of the scanned items. Metadata can include a communication protocol or format information. Communication and format information for the barcode array that follows can allow for multiple display formats and schemas to be used. For example, metadata may indicate a speed or specific tone. Any suitable handshake information can be stored and transferred as metadata before, during or after the array has been scanned. Further, shopping habits and any other information that may be used for future analytics may be included in metadata.

The method of FIG. 5 includes generating 504 an array of barcodes. For example, barcode images may be generated in accordance with any of the examples described herein. The barcodes may be ordered in an array for sequential display to a scanner according to embodiments of the present invention.

The method of FIG. 5 includes padding 506 the array of barcodes with metadata and error checking information. For example, errors may be detected on the shopper terminal 102 or the mobile computing device 104. In an example, detected errors may be sent to the shopper terminal 102 for remediation, such as calling over an attendant to check the content of the cart. Further, this function may be used for requesting that an attendant check a shopper's identification when required for purchases. Error checking may also be used to verify the transmission between the mobile computing device and the shopper terminal. Metadata and error checking can be used individually for each item, or all items. Errors detected on the shopper terminal may trigger feedback signals to re-display one or more barcodes.

The method of FIG. 5 includes displaying 508 the barcodes in sequence and waiting 508 for a signal from the shopper terminal. For example, as described in further detail herein, the display device 120 can display barcodes in sequence for scanning by the scanner 116. The barcodes may be displayed one-by-one in response to receipt of a control signal or acknowledgement signal from the shopper terminal 102.

The method of FIG. 5 includes completing 510 the purchase transaction. For example, the transaction manager 130 may validate that reading of all barcodes have been acknowledged by the shopper terminal 102. Validation may include applying a suitable checksum technique.

Barcode verification may be implemented in systems and methods according to embodiments of the present invention. A barcode verifier may perform tests. In an example, a series of eight tests may be used, where each test is graded from 0. To 4.0 (F to A). The lowest of the 8 grades is the scan grade. For many applications, a 2.5 (C) is the minimum acceptable grade. Barcode verifiers can comply with the ISO/IEC 15426-1 (linear) or ISO/IEC 15426-2 (2D) standards.

In accordance with embodiments of the present invention, a machine-readable representation of data may be generated for representing any of various data, such as, transaction data, shopping data, the like, and combinations thereof. The various data can be represented by one or more barcodes. In an example, the transaction manager 130 may generate a single barcode based on one or more pieces of data, such as, identifiers of products (e.g., UPC information) and shopper information. The barcode may be displayed to a scanner for interpretation of the data at a shopper terminal in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or diagrams of methods, apparatus (systems) and computer program products according to embodiments of the invention. For example, aspects of the present invention are described with reference to the diagram of FIG. 1 and the flowchart of FIG. 2. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A self-checkout method comprising:
   capturing, by a shopper using a mobile computing device, images of items to be purchased by the shopper;
   generating, at the mobile computing device and in response to capture of the images, purchase item identifiers of the items based on the captured images;
   generating, at the mobile computing device, a sequence of machine-readable representations of the purchase item identifiers;
   controlling a display device of the mobile computing device to display the sequence of machine-readable representations of the purchase item identifiers with a timing;
   reading, by a shopper checkout terminal, each of the machine-readable representations of the sequence displayed on the display device of the mobile computing device, the mobile computing device controlling the timing of the display of the sequence of machine-readable representations of the purchase item identifiers in response to acknowledgement signals received from the shopper checkout terminal in response to the checkout terminal reading each of the machine-readable representations of the sequence displayed; and
   conducting a self-checkout purchase transaction for the shopper for the items.

2. The method of claim 1, wherein the machine-readable representations each comprise an optical machine-readable representation.

3. The method of claim 2, wherein the optical machine-readable representation comprises a barcode.

4. The method of claim 1, wherein the machine-readable representations further comprise one or more of position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information.

5. The method of claim 1, wherein the acknowledgement signals each comprise one of an audible signal, a vibratory signal, an electromagnetic signal, and an optical signal.

6. The method of claim 1, further comprising:
   receiving shopping data associated with the purchase item identifiers;
   generating a machine-readable representation of the shopping data;
   controlling the display device to display the machine-readable representation of the shopping data; and
   receiving a signal from the shopper terminal that indicates acknowledgement of reading of the machine-readable representation of the shopping data.

7. The method of claim 6, wherein the shopping data comprises one or more of position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information.

8. The method of claim 6, wherein controlling the display device comprises controlling the display of a mobile computing device to display the machine-readable representation of the shopping data.

9. The method of claim 1, further comprising
reading machine-readable representations of the purchase item identifiers of purchase items; and
determining the purchase item identifiers.

10. A method comprising:
at a mobile computing device including a display device:
capturing, by a shopper using a mobile computing device, images of barcodes of items to be purchased by the shopper;
generating purchase item identifiers of the items based on the captured images;
generating a sequence of machine-readable representations of the purchase item identifiers; and
controlling the display device to display the sequence of machine-readable representations of the purchase item identifiers with a timing; and
at a shopper checkout terminal:
reading, from the display device of a computing device, the displayed sequence of machine-readable representations of purchase item identifiers associated with the images of barcodes of items to be purchased, wherein the images were captured by the mobile computing device;
in response to reading each machine-readable representation, controlling an output device of the shopper terminal to output a control signal to control timing of display of each of the machine-readable representations in accordance with the sequence; and
conducting a purchase transaction for a user to purchase the items based on the read machine-readable representations.

11. The method of claim 10, wherein reading the displayed sequence of machine-readable representations comprises reading a displayed sequence of barcodes.

12. The method of claim 10, wherein the machine-readable representations comprise one or more of position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information.

13. The method of claim 10, wherein controlling an output device to output a control signal comprises controlling the output device to output one or more of an audible signal, a vibratory signal, an electromagnetic signal, and an optical signal.

14. The method of claim 10, further comprising applying a validation analysis to the product item identifiers.

15. The method of claim 14, wherein the machine-readable representations further comprise communication layer information that identifies a number of machine-readable representations to be read in a transaction,
wherein the method further comprises determining an actual number of machine-readable representations that were read, and
wherein applying a validation analysis comprises comparing the number of machine-readable representations to be read and the actual number of machine-readable representations that were read.

16. A system comprising:
a mobile computing device comprising:
a display device;
a camera configured to capture images of items presented thereto, wherein the items are to be purchased by the shopper;
an input device configured to receive a plurality of signals from a shopper terminal that indicate acknowledgement of reading of a sequence of machine-readable representations of product item identifiers associated with the items; and
a transaction manager configured to:
generate the purchase item identifiers of the items based on the captured images in response to capture of the images;
generate the sequence of machine-readable representations of the purchase item identifiers;
control the display device to display the sequence of machine-readable representations of the purchase item identifiers with timing; and
control the timing of the display of the sequence of machine-readable representations of the purchase item identifiers in response to acknowledgement signals received from a shopper checkout terminal in response to the checkout terminal reading each of the machine-readable representations of the sequence displayed; and
the shopper checkout terminal comprising:
an input device configured to read each of the machine-readable representations of the sequence displayed on the display device of the mobile computing device; and
a transaction application configured to conduct a self-checkout purchase transaction for the shopper for the items.

17. The computing device of claim 16, wherein the machine-readable representations each comprise an optical machine-readable representation.

18. The computing device of claim 16, wherein the machine-readable representations further comprise one or more of position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information.

19. The computing device of claim 16, wherein the transaction manager is configured to:
receive shopping data associated with the purchase item identifiers;
generate a machine-readable representation of the shopping data;
control the display device to display the machine-readable representation of the shopping data; and
wherein the input device is configured to receive a signal from the shopper terminal that indicates acknowledgement of reading of the machine-readable representation of the shopping data.

20. A system comprising:
a mobile computing device configured to:
capture images of items presented thereto, wherein the items are to be purchased by a shopper;
generate purchase item identifiers of the items based on the captured images;
generate a sequence of machine-readable representations of the purchase item identifiers;

control a display device of the mobile computing device to sequentially display a sequence of machine-readable representations of the purchase item identifiers;

receive a plurality of signals that indicate acknowledgement of reading of the sequence of machine-readable representations to control timing of display of each of the machine-readable representations in the sequence; and control the display device to display the sequence of machine-readable representations based on the signals; and a shopper terminal configured to:

read the displayed sequence of machine-readable representations;

control an output device to output a control signal for requesting display of another of the machine-readable representations in response to reading each machine-readable representation; and conduct a self-checkout purchase transaction for the shopper for the items.

21. The system of claim 20, wherein the machine-readable representations comprise one or more of position coordinates for a location where a machine-readable representation of a purchase item identifier was read, a time when a machine-readable representation of a purchase item identifier was read, proximity information of a computing device, discount information for a purchase item, shopper profile information, transaction security information, payment information, and purchase item information.

22. The system of claim 20, wherein the machine-readable representations each comprise a bar code.

23. The system of claim 20, wherein the shopper terminal is configured to control the output device to output one or more of an audible signal, a vibratory signal, an electromagnetic signal, and an optical signal.

* * * * *